(No Model.)
G. D. OHL.
COMBINED HORSE COLLAR AND HAMES.
No. 501,097.    Patented July 11, 1893.
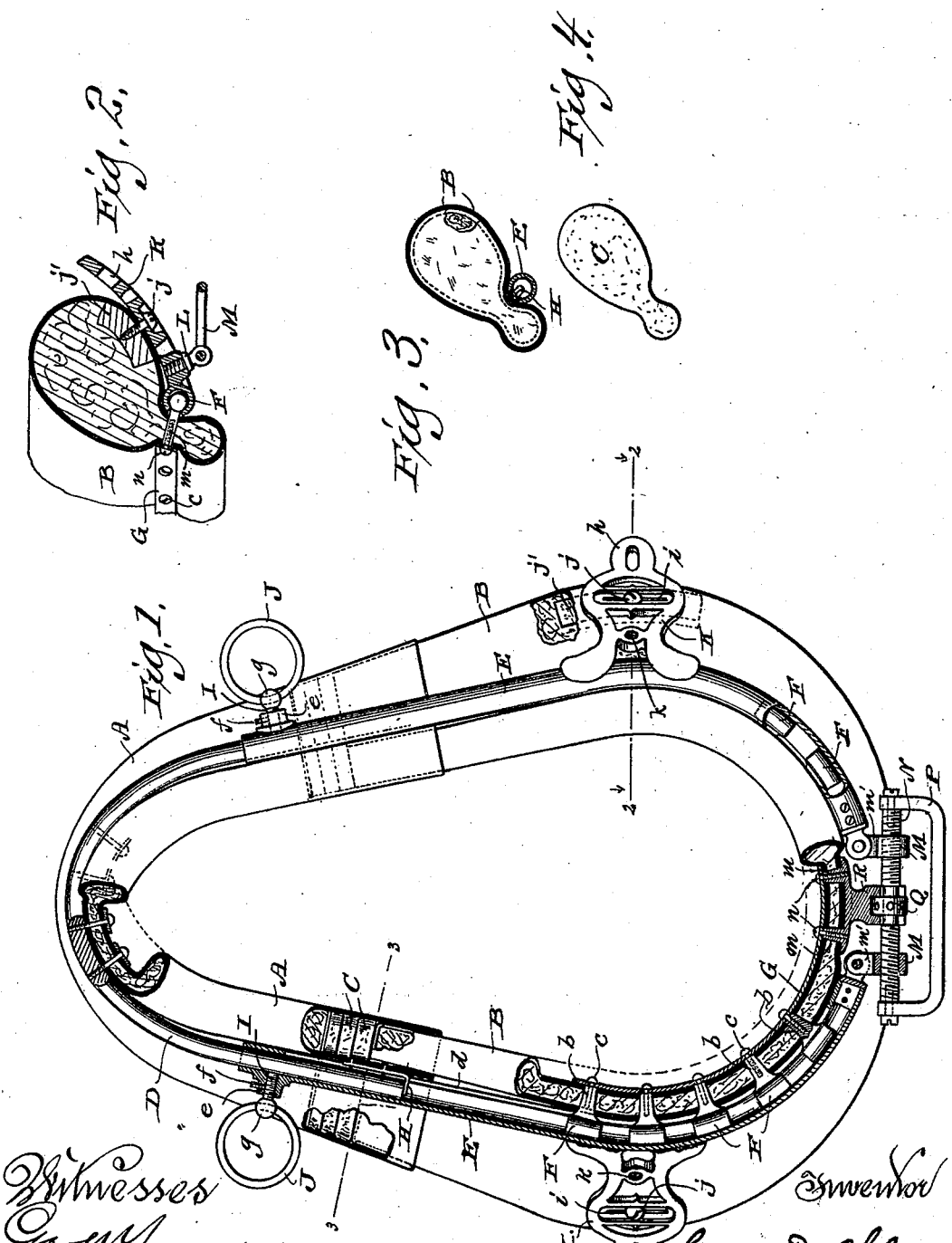

UNITED STATES PATENT OFFICE.

GEORGE D. OHL, OF MILWAUKEE, WISCONSIN.

COMBINED HORSE-COLLAR AND HAMES.

SPECIFICATION forming part of Letters Patent No. 501,097, dated July 11, 1893.

Application filed December 19, 1892. Serial No. 455,686. (No model.)

*To all whom it may concern:*

Be it known that I, GEORGE D. OHL, a citizen of the United States, and a resident of Milwaukee, in the county of Milwaukee, and in the State of Wisconsin, have invented certain new and useful Improvements in a Combined Horse-Collar and Hames; and I do hereby declare that the following is a full, clear, and exact description thereof.

My invention has for its object to provide a combined collar and hames readily adjustable to accurate fit on any horse; and it consists in certain peculiarities of construction and arrangement of parts hereinafter described with reference to the accompanying drawings and subsequently claimed.

In the drawings: Figure 1 represents a front elevation of my device partly in section; Figs. 2 and 3, horizontal sections respectively taken on lines 2—2 and 3—3 of the preceding figure, and Fig. 4, a detail plan view of a removable layer of filling for the vertically adjustable upper portion of said device.

Referring by letter to the drawings, A, B, respectively represent the upper and lower sections of my horse-collar, the ends of the former section being without filling for a certain distance whereby sockets for the reception of the ends of the other section are formed, this latter section being filled throughout its length with any suitable material. The collar sections being loosely engaged with each other and vertically adjustable I employ layers C of any suitable material, such as cork or felt, to fill the space that would otherwise be left in the ends of the upper section A when the collar is lengthened, and thus there is no weakening of said collar incidental to the vertical adjustment of its sections.

In Fig. 1, I show a series of layers C in position, and by Fig. 4, it will be seen that each of these layers has the contour of that portion of the collar in which it is loosely arranged. Inasmuch as the ends of the collar-sections have the engagement above specified, the finished collar does not present the appearance of being an adjustable one, but on the contrary is to all intents and purposes apparently the same as a collar of ordinary construction.

Riveted or otherwise rigidly secured to the upper collar-section A is a hame-section in the form of a spring-metal yoke D, the ends of which engage with slotted tubular hame-sections E, the latter being necessarily curved at their lower ends and loosely arranged on guide-lugs F that extend outward from the collar. The guide-lugs radiate from certain centers and have tangs *b* extended through the collar-section B and held in place by engaging screws *c* which latter pass through a flexible metal stay-strip G, as shown in Fig. 1. The slot *d* in each tubular hame-section E is engaged by the horizontally disposed portion of a right-angle plate H fast on the upper collar-section A and said horizontal portion of the plate comes in contact with an end of the upper hame-section D, whereby a downward push on this latter hame-section will be exerted against the lower portion of the relative collar-section to which it is rigidly secured. The horizontal portion of each plate H also serves as a means to limit the upward movement of the upper collar-section A and thereby prevents accidental displacement of said collar-section.

The hame-section D is held in its adjusted position by set-screws I that have their bearings in bosses *e* on the tubular hame-sections E, binding screws *f* being also engaged with the bosses to lock the set-screws against rotation. Each set-screw I has its outer end in the form of a knob *g* engaged by a ring J that serves as a guide for a driving-rein.

Fast on each tubular hame-section E is a vertically slotted plate K provided with a trace-eye *h*, and the slot *i* in said plate engages a guide-lug *j* on a plate *j'* positioned in the adjacent body portion of the collar. The plates K are also provided with tapped openings *k* for engagement with screws L that carry rings M for breast-straps or chains, these rings being utilized when the collar is used on a horse belonging to a wagon-team, but when said collar is used on a horse belonging to a carriage team or working in single harness, the rings may be detached from said plates.

The lower ends of the tubular hame-sections E are pivotally connected to ears *m'* on nuts M that engage a horizontal right-and-left screw N having its ends loose in those of a bail P to which a hanger for a hold-back strap may be suspended. At its center the screw N is provided with a turn-collar Q and at each side of this collar there is a non-threaded portion of said screw in engagement with a slotted furcation of a bracket R that has tapped tangs *m* extended through the lower collar-section B and retained in place by screws *n* that also engage the stay-strip G above described. By actuating the screw N the tubular hame-sections E are moved longitudinally on their guides to cause a contraction or expansion of said collar the latter being lengthened or shortened by the vertical adjustment of its upper section, these adjustments being made to obtain an accurate fit of the collar on any horse, this fitting of said collar obviating the use of neck-pads and materially improving the draft of the animal. It is also to be observed from the foregoing description that the same collar and hames may be utilized with either a carriage or wagon harness, and this of itself is a material advantage and saving of expense.

Owing to the fact that the hame-sections are permanent with the collar-sections, the collar is held in shape to a certain extent by said hames and does not require as hard filling as those of ordinary construction and thereby gains in softness and ease upon a horse.

When the combined collar and hames are used in connection with carriage-harness, the bail P serves as a means of attachment for the strap that connects said collar and girth of the harness.

By making the upper and lower sections of the horse-collar proper, each flexible and continuous, I obtain a better result, both in finish, and comfort, than when they are either separated at top and bottom, or made separate and hinged or jointed at these points, besides securing a greater uniformity in the yield, at these points, rendered necessary by adjustment, and by making the upper hame section in a continuous spring-metal yoke secured to the upper collar section, both of these parts being telescopically engaged with their respective lower sections I gain the same advantage for the hames, that I have just described relative to the collar-sections.

Having thus described my invention, what I claim as new, and desire to secure by Letters Patent, is—

1. A horse-collar comprising upper and lower flexible continuous sections telescopically adjustable one upon the other; curved hame-sections longitudinally adjustable on the lower collar-section, and another hame-section consisting of a continuous spring metal yoke that is fast on the upper collar-section but adjustably engaged with the former hame-sections, substantially as set forth.

2. A horse-collar comprising two sections telescopically adjustable one upon the other, detachable layers of filling intermediate of the opposing ends of the collar sections; curved hame-sections longitudinally adjustable on the lower collar-section, and another hame-section that is fast on the upper collar-section but adjustably engaged with the former hame-sections, substantially as set forth.

3. A horse-collar comprising two sections telescopically adjustable one upon the other; a series of guide-lugs radially disposed on the lower collar-section, tubular hame-sections loosely engaged with the guide-lugs, another hame-section that is fast to the upper collar-section and has its ends adjustable in the upper ends of the former hame-sections, a bracket depending from the center of said lower collar-section, a right-and-left screw having fixed bearings in the bracket, and nuts on the screw pivotally connected to the lower ends of the tubular hame-sections, substantially as set forth.

4. A horse-collar comprising two flexible continuous sections telescopically adjustable one upon the other; curved hame-sections longitudinally adjustable on the lower collar-section and having tug-plates provided with tapped openings, ring-carrying screws for engagement with said openings, and another hame-section consisting of a continuous spring metal yoke that is fast on the upper collar-section but telescopically adjustable with the former hame-sections, substantially as set forth.

5. A horse-collar comprising two flexible continuous sections telescopically adjustable one upon the other; curved hame-sections longitudinally adjustable on the lower collar-section, another hame-section consisting of a continuous spring metal yoke that is fast on the upper collar-section but adjustably engaged with the former hame-sections, and rein-rings provided with set-screws that engage the lower hame-section and impinge against the ends of the upper hame-section, substantially as set forth.

6. A horse-collar comprising two sections telescopically adjustable one upon the other; curved and tubular hame-sections longitudinally adjustable on the lower collar-section, another hame-section that is fast on the upper collar-section but adjustable in the former hame-sections, and angle-plates fast on said upper collar-section, these angle-plates being engaged with slots in the lower hame-sections and impinged against the ends of the upper hame-section, substantially as set forth.

7. A combined horse-collar and hames, comprising upper and lower collar-sections, telescopically engaged, and upper and lower hame-sections, also telescopically engaged, and means for holding the sections in adjustment, substantially as set forth.

In testimony that I claim the foregoing I have hereunto set my hand, at Milwaukee, in the county of Milwaukee and State of Wisconsin, in the presence of two witnesses.

GEORGE D. OHL.

Witnesses:
N. E. OLIPHANT,
WM. F. GILLE.